United States Patent
Wilson et al.

(10) Patent No.: US 7,511,912 B2
(45) Date of Patent: Mar. 31, 2009

(54) WRITING MULTIPLE SERVO SECTOR PATTERNS TO IMPROVE SERVO SECTOR ALIGNMENT ON MULTIPLE SURFACES

(75) Inventors: Nathaniel Boyd Wilson, Edmond, OK (US); Reed David Hanson, Chaska, MN (US); Timothy Francis Ellis, Tonka Bay, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 1090 days.

(21) Appl. No.: 10/302,445

(22) Filed: Nov. 22, 2002

(65) Prior Publication Data

US 2004/0100719 A1    May 27, 2004

(51) Int. Cl.
G11B 21/02    (2006.01)
(52) U.S. Cl. ........................................... 360/75
(58) Field of Classification Search .................. 360/75, 360/31, 77.03, 77.12; 369/47.1
See application file for complete search history.

(56) References Cited

U.S. PATENT DOCUMENTS

| | | | |
|---|---|---|---|
| 4,584,622 A | 4/1986 | Crosby et al. | |
| 4,933,786 A | 6/1990 | Wilson | |
| 4,956,727 A | 9/1990 | Bezinque et al. | |
| 5,047,880 A | 9/1991 | Ohno | |
| 5,136,439 A | 8/1992 | Weispfenning et al. | |
| 5,162,954 A | 11/1992 | Miller et al. | |
| 5,262,907 A | 11/1993 | Duffy et al. | |
| 5,333,140 A * | 7/1994 | Moraru et al. | 714/719 |
| 5,515,212 A * | 5/1996 | Chiao et al. | 360/77.03 |
| 5,553,086 A | 9/1996 | Sompel et al. | |
| 5,585,976 A | 12/1996 | Pham | |
| 5,737,145 A | 4/1998 | Jung | |
| 5,777,816 A | 7/1998 | Hampshire et al. | |
| 5,784,219 A | 7/1998 | Genheimer | |
| 5,818,654 A | 10/1998 | Reddy et al. | |
| 5,828,508 A | 10/1998 | Whaley et al. | |
| 5,978,170 A | 11/1999 | Izumiya et al. | |
| 6,038,097 A | 3/2000 | Le et al. | |
| 6,104,558 A | 8/2000 | Greenberg et al. | |
| 6,181,500 B1 | 1/2001 | Serrano et al. | |
| 6,198,584 B1 | 3/2001 | Codilian et al. | |
| 6,282,051 B1 * | 8/2001 | Albrecht et al. | 360/75 |
| 6,345,021 B1 * | 2/2002 | Belser et al. | 369/47.1 |
| 6,356,401 B1 | 3/2002 | Bates et al. | |
| 6,404,582 B1 | 6/2002 | Rodrigues de Miranda | |
| 6,433,951 B1 * | 8/2002 | Lubratt | 360/77.12 |
| 6,522,488 B2 * | 2/2003 | Sasamoto et al. | 360/31 |
| 6,757,118 B1 * | 6/2004 | Walker et al. | 360/31 |

* cited by examiner

Primary Examiner—Fred Tzeng
(74) Attorney, Agent, or Firm—Fellers, Snider, et al.

(57) ABSTRACT

Method and apparatus for certifying servo sectors on recording surfaces of a disc stack of a data storage device to promote servo sector alignment among the various recording surfaces. A reference servo sector pattern is written to a first recording surface, the reference pattern comprising a plurality of angularly spaced apart servo sectors. Multiple interleaved sets of servo sector patterns are written to each of the remaining recording surfaces, each interleaved pattern respectively comprising a plurality of angularly spaced apart servo sectors. A selected interleaved pattern is identified from each of the remaining surfaces that provides a desired alignment with the reference servo sector pattern, and the non-selected servo sector patterns are overwritten. The servo patterns can be written to the discs prior to installation using a multiple disc writing (MDW) station, or after installation of the discs into the data storage device using a servo track writing (STW) station.

20 Claims, 6 Drawing Sheets

WRITING MULTIPLE SERVO SECTOR PATTERNS TO IMPROVE SERVO SECTOR ALIGNMENT ON MULTIPLE SURFACES

FIELD OF THE INVENTION

This invention relates generally to the field of digital data storage devices and more particularly, but not by way of limitation, to improving angular alignment of servo sectors among a plurality of axially aligned disc recording surfaces by writing multiple sets of servo sector patterns, selecting those patterns that provide the best alignment, and overwriting the rest.

BACKGROUND

Disc drives are data storage devices used to store and retrieve digital user data in a fast and efficient manner. A typical disc drive stores such data on a number of magnetic recording discs which are rotated at a constant high speed. An actuator controllably moves a corresponding number of data transducing heads to access data stored in tracks defined on the disc surfaces.

Servo data are written to the discs during disc drive manufacturing to define the tracks and to provide head positional information to a closed loop servo control circuit. The servo data are used by the servo control circuit during both seeking and track following operations. In a typical embedded servo scheme, the servo data are arranged in servo sector patterns. The servo sectors are angularly spaced apart and interspersed with user data sectors to which user data are stored.

The servo data include index data used to identify an index reference position on the disc surfaces. The index reference position corresponds to a "once-around" (i.e., zero degrees) angular reference for the discs. A typical servo control circuit tracks the angular position of the head by counting the number of servo fields encountered after each occurrence of the index reference position.

When multiple recording surfaces are used, it is often desirable to provide a selected angular alignment of the servo sectors on the various surfaces. In this way, a single servo burst counter can be used to track the angular position of the discs with respect to the heads (i.e., the number of servo sectors since the most recent index reference position) as different heads are selected in turn.

With the continued demand for disc drives that provide ever higher data storage capacities and transfer rate performance levels at lower costs, designers continue to provide successive generations of products with ever higher areal data storage densities. It will be recognized that for a given area on the recording surface of a disc, more data can be stored by increasing the number of bits per linear distance along the tracks (e.g., bits per inch, BPI) as well as by increasing the number of the tracks per distance across the radius of the disc (e.g., tracks per inch, TPI). Achieving a higher track density generally requires making the physical width of each track narrower. This in turn requires higher levels of precision in the writing of the servo data.

Historically, the servo data have typically been written to the discs in-situ, that is, after the discs have been installed into the drive. In such a system a fully or partially assembled drive is provided to a servo track writer (STW) station. The station employs a precisely controlled positioning arm or other mechanism to advance the actuator across the discs at selected increments to allow the disc drive heads to write the servo data.

More recently, some manufacturers have moved to the use of multiple disc writer (MDW) stations. An MDW station prerecords the servo data onto multiple discs at a time using specially configured, low vibration disc motors and actuators. After the servo data have been prerecorded to the discs, the discs are removed from the MDW station and installed into the drives.

While MDW stations have been found to provide significant improvements in the writing of servo data, excessive angular misalignments in the servo data can sometimes arise when the prerecorded discs are subsequently installed onto a disc drive spindle motor. However, drives of the present generation can use around 200 servo sectors per revolution, meaning that each servo frame window (i.e., the distance between adjacent servo sectors) is a little less than two degrees around the disc circumference. It is difficult using existing manufacturing processes to ensure that all of the servo sectors on multiple disc surfaces will be aligned within the required timing tolerances when prerecorded discs are stacked onto a spindle motor hub. Head-to-head skew (misalignments) within the actuator can further reduce the margin available to achieve the desired servo sector alignment.

Even if the servo data are written using an STW station so that the same heads that write the servo data are also subsequently used to transduce the servo data during operation, excessive misalignment of the servo sectors can still arise. In order to achieve the desired amount of precision in the writing of the data, the positioning arm in a typical STW station typically clamps and holds the actuator in a rigid fashion. It has been found that once the positioning arm releases the actuator, the heads can move to different positions (i.e., head skew is introduced). Thus, even if the servo data are perfectly aligned during the STW operation, the resulting head skew after the STW operation is completed can result in excessive misalignment with respect to the final relative positions of the heads.

Accordingly, with continued demands for ever higher precision in the writing of servo data, there remains a continued need to promote improved angular alignment of servo sectors on different disc recording surfaces in a disc drive. It is to such improvements that the claimed invention is directed.

SUMMARY OF THE INVENTION

As embodied herein and as claimed below, the present invention is generally directed to a method and apparatus for certifying servo sectors on recording surfaces of a disc stack of a data storage device to promote servo sector alignment on the various recording surfaces.

A reference servo sector pattern is written to a first recording surface comprising a plurality of angularly spaced apart servo sectors. Multiple interleaved sets of servo sector patterns each respectively comprising a plurality of angularly spaced apart servo sectors are written to each of the remaining recording surfaces. Preferably, two interleaved sets of servo sector patterns are written one-half servo frame apart on each remaining surface.

An optimum pattern is identified on each of the remaining surfaces that provides a desired alignment with the reference servo sector pattern. The reference pattern and the optimum patterns are thereafter used during normal servo operation to position the heads, and the remaining, non-selected servo sector patterns are overwritten.

The servo patterns can be prerecorded on the discs using a multiple disc writing (MDW) station prior to installation of the discs into the data storage device. The servo patterns can also be written to the discs after the discs have been installed into the data storage device using a servo track writing (STW) station.

These and various other features and advantages which characterize the claimed invention will be apparent from a reading of the following detailed description and a review of the associated drawings.

DETAILED DESCRIPTION

Figure 1:
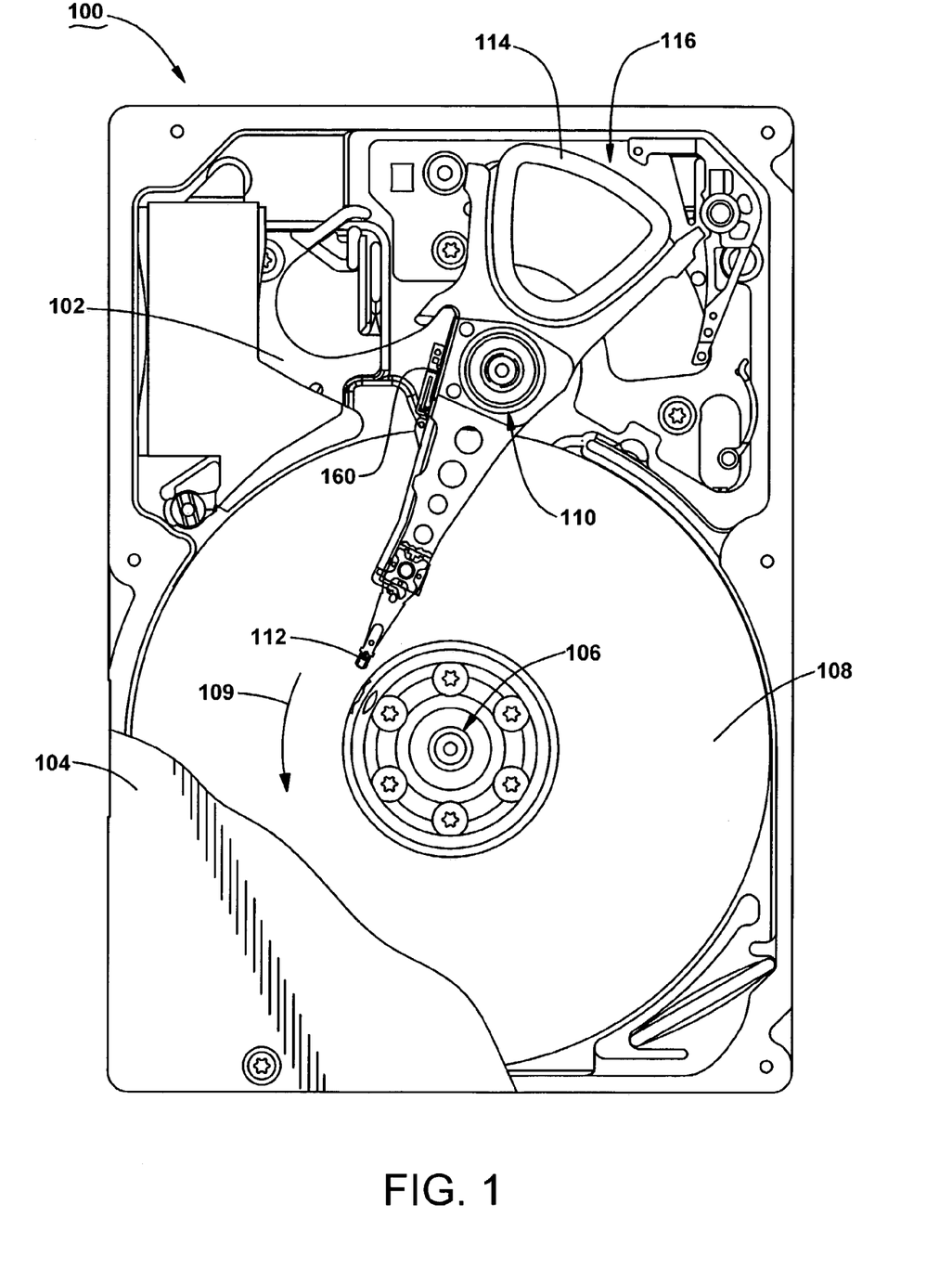
FIG. 1 is a top plan view of a disc drive data storage device constructed and operated in accordance with preferred embodiments of the present invention.

FIG. 1 shows a disc drive data storage device 100 of the type used to store and retrieve digital data. A base deck 102 cooperates with a top cover 104 (shown in partial cutaway) to form an environmentally controlled housing for the drive 100.

A spindle motor 106 supported within the housing rotates a number of rigid magnetic recording discs 108 in a rotational direction 109. An actuator 110 is provided adjacent the discs 108 and moves a corresponding number of heads 112 across the disc recording surfaces through application of current to an actuator coil 114 of a voice coil motor (VCM) 116.

Figure 2:
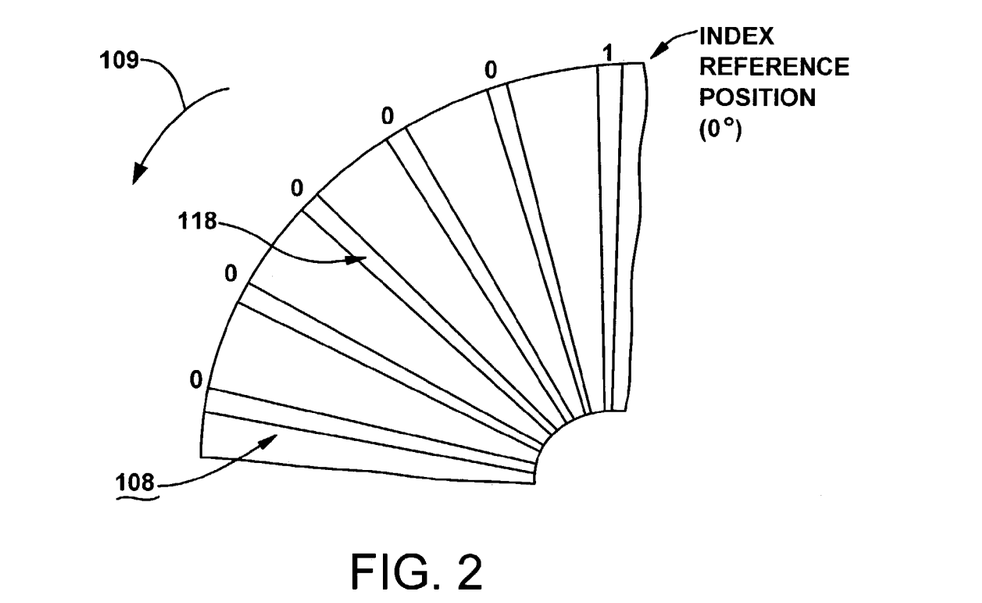
FIG. 2 generally illustrates the manner in which servo data are preferably arranged on the discs of the disc drive of FIG. 1.
Figure 3:
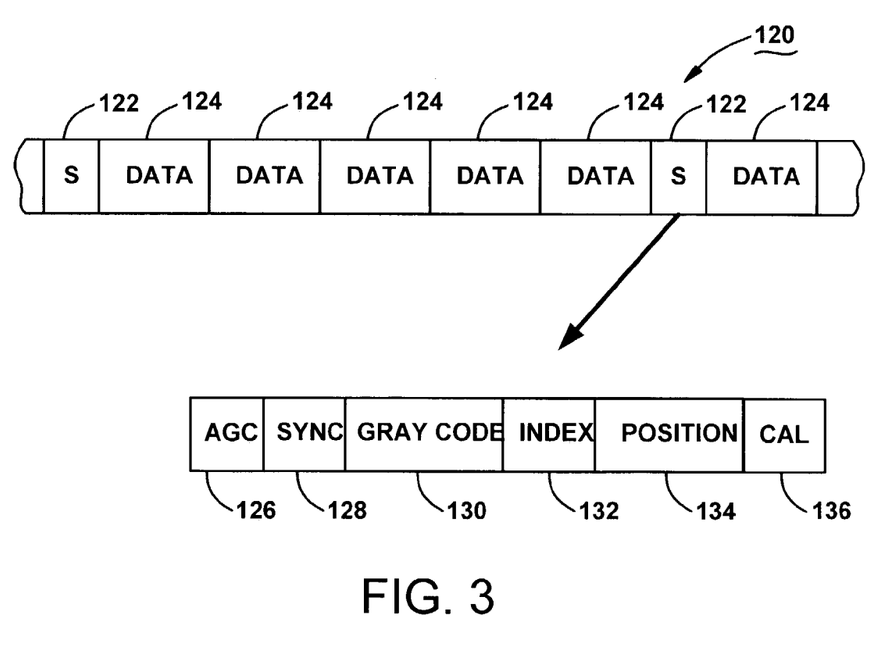
FIG. 3 is a representation of a portion of a track of the disc of FIG. 2 illustrating the respective arrangement of servo sectors and user data sectors, as well as an exemplary format for the servo sectors.

FIG. 2 shows a portion of one of the discs 108. Servo wedges 118 radially extend from the innermost to the outermost radii of the disc recording surfaces. The servo wedges 118 are written during disc drive manufacturing to define a number of concentric tracks 120 as shown in FIG. 3. Each servo wedge 118 comprises a plurality of radially aligned servo sectors (S) 122.

User data sectors 124 are defined in the areas along the tracks between adjacent servo sectors 122 during a disc drive formatting operation. The sectors 124 store fixed-size blocks (such as 512 bytes) of user data from a host device. While the number of servo wedges 118 per disc will depend upon the configuration of a particular drive, it will be contemplated for purposes of the present discussion that each disc surface in the disc drive 100 has a total of 192 such wedges 118. Thus, each selected head 112 will encounter a total of 192 servo sectors 122 over each full revolution of the associated disc 108.

As exemplified by FIG. 3, each servo sector includes an automatic gain control (AGC) field 126, a synchronization (sync) field 128, a Gray code (GC) field 130, an index field 132, a position field 134 and a calibration (CAL) field 136. The AGC field 126 provides an oscillating (2T) pattern that allows the proper gain characteristics to be set in preparation for receipt of the remaining servo data. The sync field 128 provides a particular bit sequence for timing detection. The GC field 130 provides a unique track address to indicate the radial position of the head 112.

The index field 132 indicates the angular position of the head 112. The position field 134 provides intra-track positioning data, and the calibration field 136 stores a calibration term that reduces repeated run out (RRO) in the track. The calibration field 136 can further be used as discussed below. It will be apparent that other formats for the servo sectors 122 can readily be used as desired.

The index field 132 is preferably provided with one of two different (binary) magnetically stored patterns: a "non-index" pattern which corresponds to a logical zero (0), and an "index" pattern which corresponds to a logical one (1).

Preferably, all of the index fields 132 in one selected servo wedge 118 (FIG. 2) from each disc surface are selected to store the logical 1 pattern, and the remaining index fields 132 in the remaining wedges 118 store the corresponding logical 0 pattern. The servo sectors 122 with the logical 1 pattern are identified as corresponding to the index reference position (i.e., zero degrees), as indicated in FIG. 2.

Figure 4:
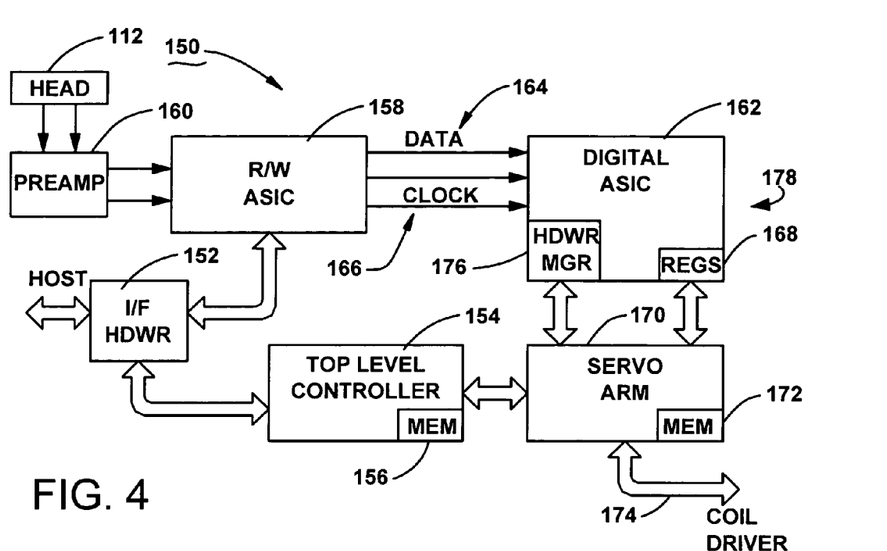
FIG. 4 is a functional block diagram of communication and control electronics of the disc drive of FIG. 1.

FIG. 4 provides a functional block diagram of communication and control electronics 150 of the disc drive 100 of FIG. 1. Interface (I/F) hardware 152 provides communication ports with the host device and includes a data buffer, error correction code (ECC) circuitry, and a sequencer (disc manager). Overall disc drive control is provided by a top level controller 154 with associated memory 156. The controller 154 and interface hardware 152 operate in accordance with a selected industry standard host communications protocol, such as Fibre Channel.

A read/write application specific integrated circuit (R/W ASIC) 158 includes read and write channel circuitry to provide the requisite encoding for data to be written to the discs 108, and the requisite signal processing to decode transduced readback signals from the selected head 112. Such readback signals first undergo preamplification by a preamplifier/driver circuit (preamp) 160 mounted to the side of the actuator 110 (FIG. 1). Preferably, the R/W ASIC is a purchased component commercially available from a number of sources such as Marvel Technology, Inc.

The R/W ASIC 158 includes servo demodulation capabilities that enable the device to detect and output the servo data from the servo fields 122 to a digital ASIC 162. The servo data are provided along serial data lines 164 and a clock signal is provided via clock line 166. The digital ASIC 162 conditions the servo data by detecting the various different types of servo data (Gray code, position field data, etc.) and arranging the data into multi-bit form (e.g., 16-bits).

The conditioned servo data are loaded into registers 168 for retrieval by a servo ARM (advanced RISC (reduced instruction set computer) machine) device 170. The ARM device 170 is a servo processor which operates in accordance with programming in ARM memory 172 and instructions from the controller 154. The ARM device 170 outputs coil current commands via path 174 to a coil driver (not shown) which in turn applies the appropriate current to the actuator coil 114 (FIG. 1) to position the selected head as desired across the surface of the associated disc 108.

The digital ASIC 162 includes a hardware manager 176. The hardware manager 176 provides various timing control functions including counting the number of servo sectors 122 that have passed the head 112 since the most recent index reference position. The hardware manager 176 thus provides a continual indication of the angular position of the heads 112 to the ARM device 170.

Preferably, the hardware manager 176 employs a virtual index approach so that sector counts continue from a reference head (e.g., head 0) when different heads are selected. The index reference position information from the remaining heads is ignored and any angular shifts for the different surfaces are taken into account using an offset table. For reference, the demodulation portions of the R/W ASIC 158, the digital ASIC 162, the ARM device 170 and the coil driver collectively form a servo control circuit (generally denoted at 178).

Figure 5:
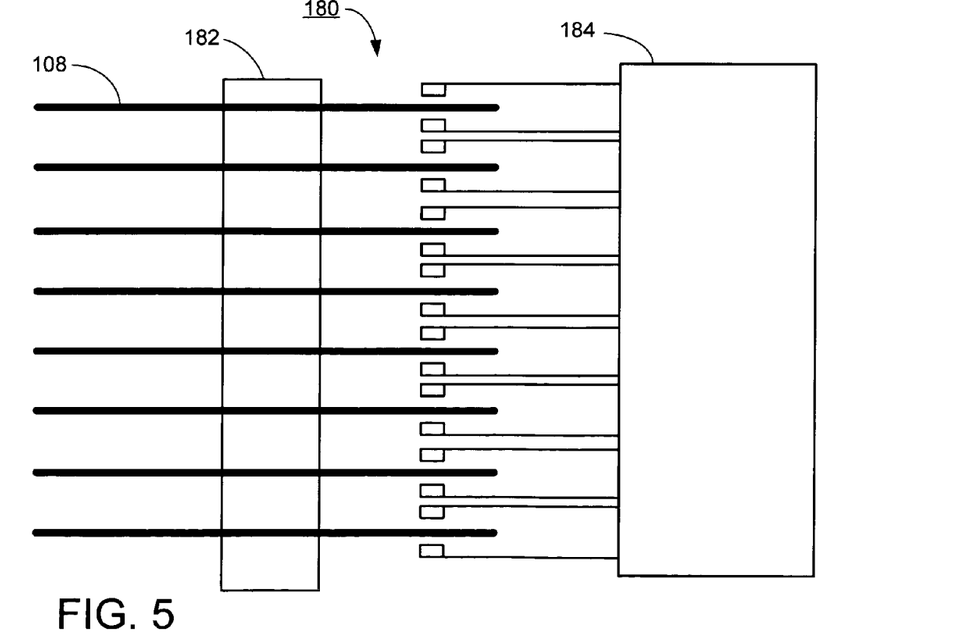
FIG. 5 illustrates a multiple disc writer (MDW) station in which the servo sectors are prerecorded onto the discs prior to installation into the disc drive.

The servo data from the servo sectors 122 are transduced and used by the servo control circuit 178 both during track following (in which a selected head is maintained over a selected track) as well as during seek operations (in which a selected head is moved from an initial track to a destination track). The servo data can be written using a servo track writer (STW) station as discussed below after installation of the actuator 110 and discs 108 onto the base deck 102. However, to achieve high track densities the servo data are preferably prerecorded on a multiple disc write (MDW) station 180 as shown in FIG. 5.

The MDW station 180 includes a low vibration motor 182 (preferably utilizing fluid bearings) to rotate a large number of discs 108 at a selected rotational velocity. A specially configured actuator 184 supports a number of servo writing heads 186 to write the servo sectors 122 to the discs 108. The MDW station preferably operates in a reduced density atmosphere (such as helium) to further reduce vibration and allow the heads 186 to fly closer to the disc surfaces. This results in higher speed, higher precision writes and reduces bottlenecks in the manufacturing process.

The prerecorded discs 108 are installed onto disc drive spindle motors (such as 106 in FIG. 1) during subsequent manufacturing. Preferably, the prerecorded discs 108 are provided with index marks on the edges of the discs to nominally align the servo sectors on each of the disc surfaces in the completed disc stack. Some misalignment of the servo sectors 122 on the various surfaces will nevertheless typically result due to a number of factors, including manufacturing tolerances in the stacking equipment as well as head skew (i.e., variation in the angular alignment of the heads 112 within the actuator 110 due to tilt in the actuator axis or variation in the relative placement of the actuator arms and flexures).

Figure 6:
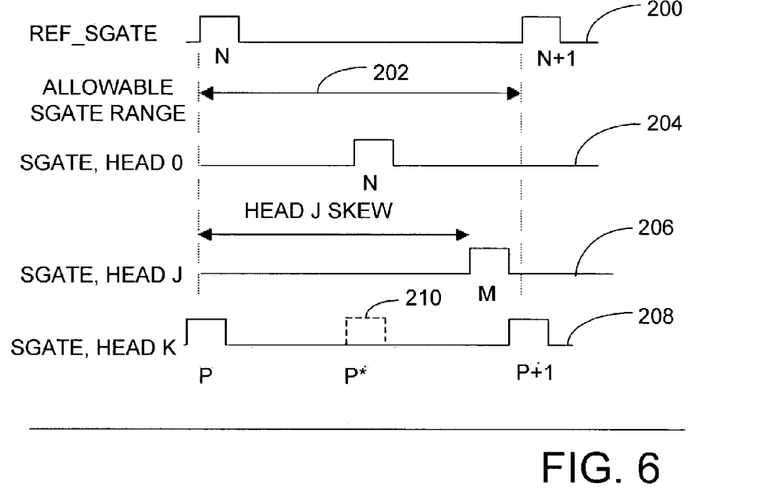
FIG. 6 provides a representative timing diagram to illustrate problems associated with servo sector misalignment.

The significance of such misalignments can be seen by a review of the servo timing diagram of FIG. 6, which is representative of various timing signals generated by a servo control circuit such as 178 of FIG. 4. A servo reference gate (REF_SGATE) signal 200 has positive going transitions to identify an allowable servo gate range (window) 202 into which the servo sectors 122 on the respective disc surfaces should fall. The identifier N indicates the Nth servo sector 122 since the most recently obtained index reference position. It is contemplated that in the present example nominally all of the Nth servo sectors should fall within the Nth reference gate window, although other configurations are envisioned.

An SGATE, HEAD 0 signal 204 indicates the occurrence of the Nth servo sector from the index reference position as ideally falling in the middle of the allowable window. An SGATE, HEAD J signal 206 for a different head J shows an excessive amount of head skew which results in servo sector M (i.e., the Mth sector from index) as falling within the Nth window. An SGATE, HEAD K signal 208 shows the Pth and P+1th servo sectors 122 overlapping the boundaries of the Nth window.

Such misalignments as shown in FIG. 6 can make it difficult for hardware managers such as 176 to reliably track the angular position of the heads 112 after head switching operations. Alignments such as shown by the SGATE, HEAD K signal 208 are particularly difficult to handle since the reference gates are asserted while the sectors are passing under the head.

The present invention (as embodied herein and as claimed below) addresses these and other limitations of the prior art by initially providing multiple sets of servo sector patterns on the various disc surfaces. During a certification procedure, those sets that provide the best alignment (such as the intermediate sector P* shown at 210 in FIG. 6) are selected for subsequent use by the drive. The remaining, non-selected sets are then preferably overwritten to free up space for the storage of user data.

Figure 7:
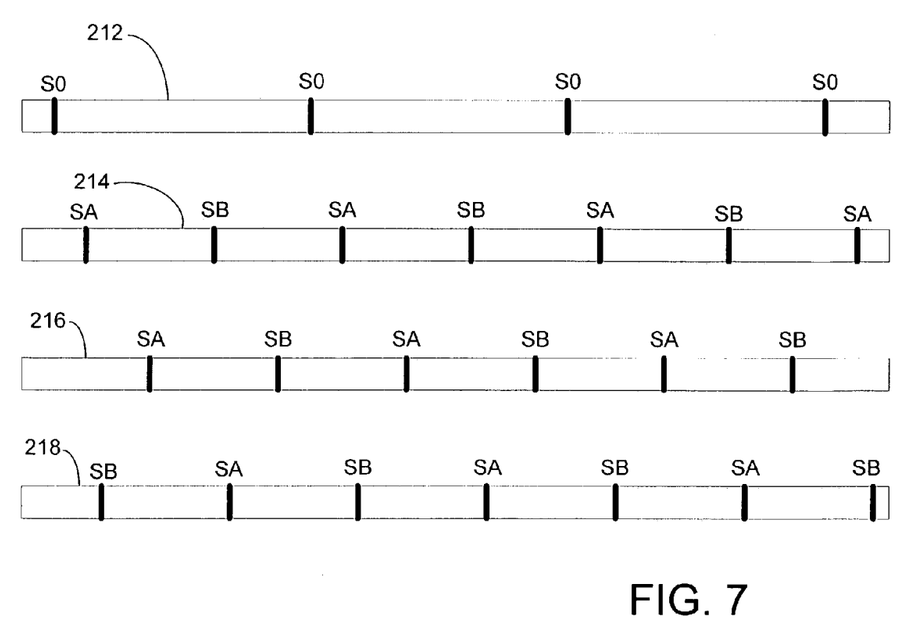
FIG. 7 shows a number of tracks for a corresponding number of data recording surfaces to which multiple sets of servo sector patterns have been written in accordance with preferred embodiments.

FIG. 7 shows a number of tracks for a corresponding number of data recording surfaces to which multiple sets of servo sector patterns have been written in accordance with preferred embodiments of the present invention. It will be understood that the recording surfaces represented in FIG. 7 are provided on a number of discs that have been affixed to a hub of a spindle motor (such as the spindle motor 106 of FIG. 1) to form a disc stack. While in a preferred embodiment the servo data have been prerecorded by the MDW station 180 of FIG. 5, in an alternative preferred embodiment the servo data have been written by the drive using an STW station after the discs 108 have been installed.

Track 212 represents a selected reference track on a first disc recording surface. The first surface preferably has a single servo sector pattern (identified as the S0 pattern) written in a format corresponding to that shown in FIG. 2 (i.e., a number of radially spaced apart wedges made up of servo sectors). Tracks 214, 216 and 218 represent tracks on second, third and fourth surfaces respectively which are axially aligned with the first surface within the stack.

It is contemplated in the present example that the tracks 212 and 214 are on opposing sides of a first disc, and the tracks 216 and 218 are on opposing sides of a second disc. However, the various tracks 212, 214, 216 and 218 could alternatively represent any other combination of disc surfaces, including but not limited to the top surfaces of four different discs stacked about the spindle motor 106.

Two patterns of servo sectors have been shown to be written to the second, third and fourth surfaces, with these patterns respectively identified as SA and SB. Preferably, the servo sectors in the respective SA and SB patterns can be distinguished in a number of ways including differentiating data words written to the respective calibration fields 136 (FIG. 2), but are otherwise nominally identical. It will be noted that the SA and SB patterns are preferably configured to identify index reference positions that nominally align with the index reference position of the S0 pattern.

Figure 8:
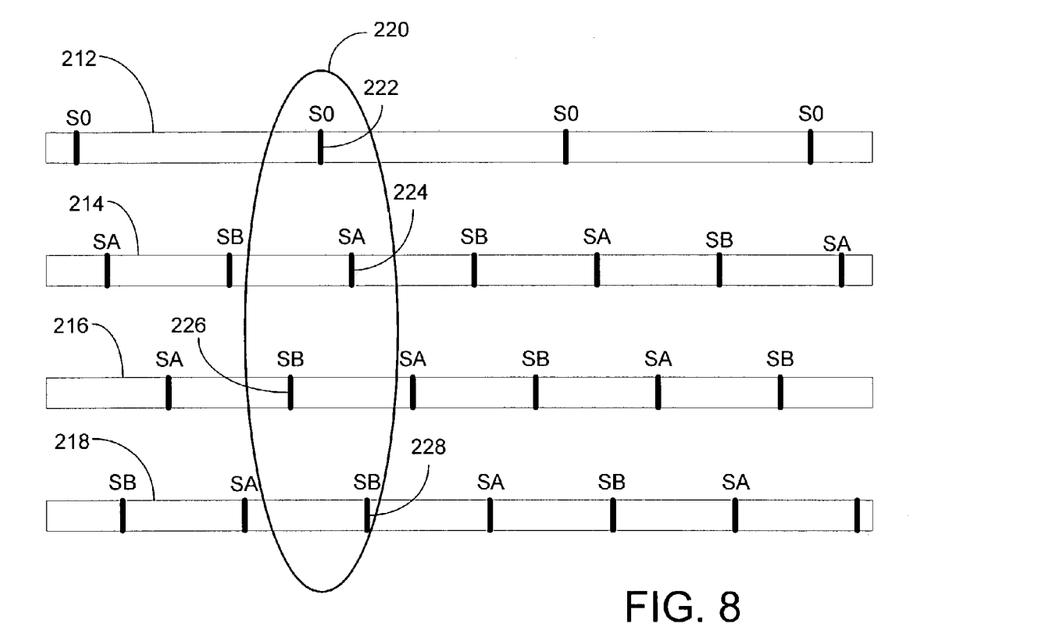
FIG. 8 shows the patterns of FIG. 7 with the selection of a particular set of the servo sector patterns from each recording surface with respect to a reference set on a first surface.
Figure 9:
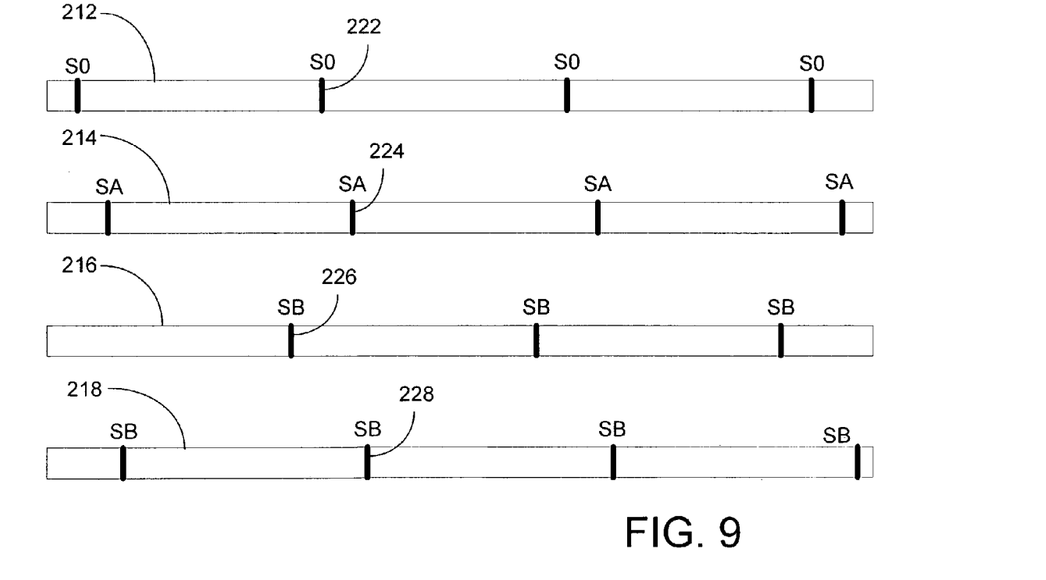
FIG. 9 shows the patterns of FIGS. 7 and 8 after the non-selected patterns have been overwritten.

As shown by FIG. 8, a selected servo sector (denoted at 222) on the first track 212 is identified as a reference point, and the closest servo sectors on the remaining tracks 214, 216 and 218 are identified as indicated at 220. These closest sectors are SA pattern sector 224 on track 214, SB pattern sector 226 on track 216, and SB pattern sector 228 on track 218. The SA pattern on track 214 and the SB patterns on tracks 216 and 218 provide the best alignment with the reference S0 pattern on track 212, and will thus be used during subsequent operation of the drive 100. The remaining, non-selected patterns are thereafter overwritten, as indicated by FIG. 9.

This approach ensures that the resulting servo sectors used by the servo control circuit 178 are nominally aligned within required timing window tolerances. Further improvements in angular resolution can be obtained with the use of a greater number of initial patterns on the surfaces (such as three or more instead of the two shown in FIGS. 7 and 8).

To simplify manufacturing and tracking requirements, the same number of patterns written to the second, third and fourth surfaces can also be written to the first surface as well. In this alternative approach the track 212 shown in FIGS. 7 and 8 would be initially provided with the SA and SB patterns as well so that the first surface is nominally identical to the second, third and fourth surfaces. One of the patterns on the first surface would be selected as the reference pattern and the remaining, unnecessary pattern would be subsequently overwritten.

The optimum approach for a given application will depend upon a number of factors including the total numbers of discs installed in the drives and whether both fully populated and depopulated configurations (i.e., a full complement or a reduced complement of heads and discs) are concurrently fabricated in the process, thus increasing manufacturing and handling complexity. Another factor is the extra time required to write one or more additional, unused sets of patterns to the reference surfaces.

Figure 10:
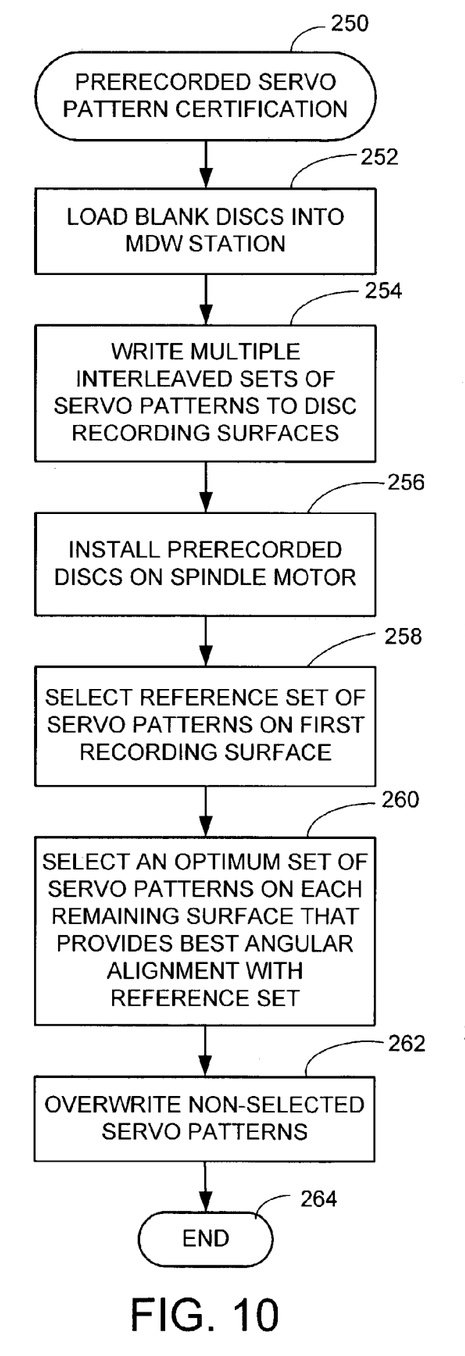
FIG. 10 provides a flow chart for a PRERECORDED SERVO PATTERN CERTIFICATION routine representative of steps carried out in accordance with preferred embodiments to provide improved alignment of servo sector patterns on multiple recording surfaces prewritten by a multiple disc writing (MDW) station as shown in FIG. 5.

FIG. 10 provides a flow chart for a PRERECORDED SERVO PATTERN CERTIFICATION routine 250 to summarize the foregoing discussion for the case when the servo sectors are prerecorded on the discs 108 prior to installation. At step 252, blank discs 108 are installed into an MDW station such as 180 in FIG. 5. Multiple interleaved sets of servo sector patterns (such as the SA and SB patterns of FIG. 7) are written to various disc recording surfaces at step 254.

As discussed above, the multiple patterns can be written to every surface, or to most of the surfaces with an appropriate number of the remaining surfaces receiving a single pattern (such as the S0 pattern of FIG. 7). Whatever patterns are selected for writing during step 254, the process will conclude with a conventional readback verification step to ensure the data on each of the surfaces have been written correctly.

The prerecorded discs 108 are thereafter removed from the MDW station and installed onto disc drive spindle motors (such as 106, FIG. 1) at step 256 to form a number of disc stacks each having a plurality of axially aligned surfaces. For each stack, one set of servo sector patterns (such as the S0 pattern) on a first recording surface is selected at step 258 to comprise a reference set of patterns. As shown by step 260, an optimum set of servo sector patterns for each surface within the remainder of the stack is then selected, with each optimum set of servo sector patterns providing the best angular alignment with the reference set of patterns.

In a preferred embodiment, during step 260 the servo control circuit 178 enters a track following mode on a selected reference track on the first disc surface and obtains index lock on the reference pattern. The servo control circuit then switches to each successive head in turn and evaluates the timing of each successively received servo sector relative to servo timing windows (200, FIG. 6) based on the reference track. Multiple samples are preferably taken, and that set of servo sectors exhibiting the best alignment is identified.

The routine of FIG. 10 continues to step 262 where the non-selected servo sector patterns on the various surfaces are thereafter overwritten. The overwriting step can result in the complete reconfiguration of the portions of the tracks that previously stored the non-selected servo sector patterns to now store user data in data sectors 124 (such as shown in FIG. 3). In an alternative preferred embodiments, some portion of the non-selected servo sector patterns (such as the calibration fields 136, etc.) can be maintained to provide intermediate calibration data to the servo control circuit 178 to aid in reducing repeated runout (RRO). The routine then ends at step 264 and the manufacturing process continues with conventional steps to complete the disc drive assembly.

Figure 11:
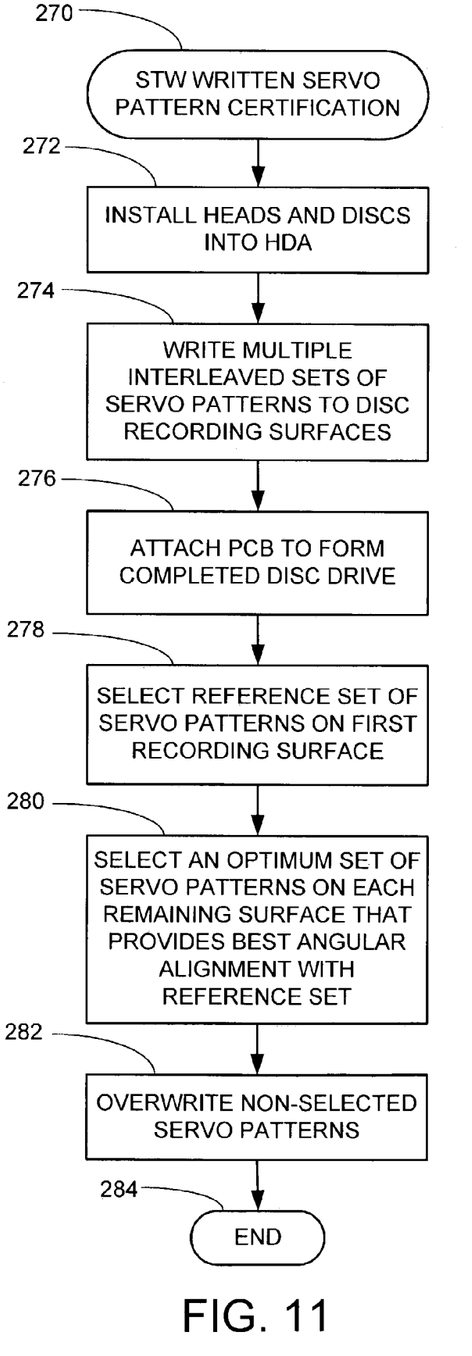
FIG. 11 provides a flow chart for a STW WRITTEN SERVO PATTERN CERTIFICATION routine representative of steps carried out in accordance with preferred embodiments to provide improved alignment of servo sector patterns on multiple recording surfaces written in-situ by a servo track writing (STW) station.

FIG. 11 provides a flow chart for an STW WRITTEN SERVO PATTERN CERTIFICATION routine 270, which summarizes preferred steps carried out when the data are written in-situ at an STW station.

The disc drive 100 is at least partially assembled to the extent that the actuator 110 and the discs 108 are installed onto the base deck 102 to form a head-disc assembly (HDA), as shown by step 272. The HDA comprises the mechanical portion of the disc drive 100 apart from the electronics 150 of the disc drive printed circuit board. The HDA is provided to an STW station at step 274, which as discussed above writes the multiple interleaved sets of servo patterns to the various disc recording surfaces within the disc stack.

Since the discs are already in place, the manufacturing and handling issues associated with installing prerecorded discs are not present, so it may be preferable to just write a single set of servo patterns to the reference surface and write the multiple interleaved sets of servo sector patterns to the remaining disc surfaces. On the other hand, in some instances writing multiple patterns to all of the disc recording surfaces may be the better choice when sequencing, verification and rework concerns are taken into account. As before, the writing step 274 is contemplated as including a verification step at the conclusion of the STW process.

At the conclusion of the STW process, as shown by step 276 the HDA is removed from the STW station and mated with a disc drive PCB to form a completed disc drive assembly. After the electronics are sufficiently initialized the servo control circuit 178 operates to select a reference set of servo sector patterns on a first recording surface at step 278, and to select an optimum set of servo sector patterns on the remaining recording surfaces at step 280 that provide the best alignment with the reference set. As discussed above, even though the servo data were written after the heads 112 and discs 108 were installed, various factors such as head skew can be readily introduced at the conclusion of the STW process which leads to a different inter-pattern timing than was present during the STW process. The non-selected patterns are subsequently overwritten at step 282 as before, and the process ends at step 284.

It will be noted that the foregoing approaches are relatively simple and straightforward to implement and promote optimum alignment of the various servo sector patterns in the completed disc drive 100. However, as sometimes occurs during manufacturing it may be necessary from time to time to remove an installed actuator 110 due to a head failure or other anomalous event and replace it with a new, replacement actuator. Since the alignment process takes the existing head skew pattern into account, the new, replacement actuator may have a head-skew pattern that sufficiently differs from the original actuator such that the servo sectors are no longer adequately aligned.

Statistical analysis has suggested, however, that in many cases the replacement heads may still adequately align with the sectors so that the selection during the initial certification process will be adequate for the replacement actuator. The effects of a mismatch in the event of a replacement actuator can be reduced by carrying out at least some testing of the heads prior to the overwriting steps (steps 262 and 282 in FIGS. 10 and 11); that is, delaying the overwriting steps until a point at which most error events requiring actuator replacement have occurred.

Finally, it is contemplated that in some cases when an actuator 110 requires removal, it may make more sense from a process standpoint to go ahead and replace the disc stack as well and repeat the certification process with the new actuator and disc stack.

In accordance with the foregoing discussion, it will be recognized that the present invention (as embodied herein and as claimed below) is generally directed to a method and apparatus for certifying servo sectors on recording surfaces of a disc stack to provide improved alignment on the various recording surfaces.

In accordance with one aspect, the method comprises writing to a first recording surface of the disc stack a reference servo sector pattern (such as S0 pattern) comprising a plurality of angularly spaced apart servo sectors (such as 222) and writing to a second recording surface of the disc stack multiple interleaved sets of servo sector patterns (such as SA and SB patterns) each respectively comprising a plurality of angularly spaced apart servo sectors (such as 224, 226 and 228—exemplified by steps 254, 274).

A selected one of the multiple interleaved sets of servo sector patterns on the second recording surface that provides a desired alignment (such as 202, 220), with the reference servo sector pattern is next identified(exemplified by steps 260, 280), and the remaining ones of the multiple interleaved sets of servo sector patterns are overwritten (exemplified by steps 262, 282).

In a preferred embodiment, the respective writing steps are carried out by a MDW station (such as 180—exemplified by step 252). In an alternative preferred embodiment, the respective writing steps are carried out in-situ using a STW station (exemplified by step 274).

In accordance with another aspect, a data storage device (such as 100) is provided comprising a disc stack (such as 106, 108) comprising a plurality of axially aligned recording surfaces including a first recording surface and an actuator (such as 110) which supports a corresponding array of data transducing heads (such as 112) adjacent the recording surfaces.

A servo control circuit (such as 178) controllably positions the heads using angularly spaced apart servo sectors on the respective recording surfaces, the servo control circuit comprising means (such as 170, 172) for selecting the servo sectors for use by identifying an optimum set of servo sectors on each remaining one of the recording surfaces from a plurality of interleaved sets of servo sectors thereon, the optimum set of servo sectors providing a desired alignment with a reference set of servo sectors on the first recording surface. Preferably, the servo control circuit further overwrites the non-selected sets of servo sectors on each remaining one of the recording surfaces.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the appended claims.

What is claimed is:

1. A method comprising:
   writing to a first recording surface a reference servo sector pattern;
   writing to a second recording surface multiple interleaved sets of servo sector patterns;
   identifying a selected one of the multiple interleaved sets of servo sector patterns on the second recording surface that provides a desired angular alignment with the reference servo sector pattern.

2. The method of claim 1 further comprising overwriting the remaining ones of the multiple interleaved sets of servo sector patterns.

3. The method of claim 2, wherein the method further comprises prerecording the servo sector patterns and axially aligning the prerecorded first and second recording surfaces onto a motor in a data storage device prior to the identifying and overwriting steps.

4. The method of claim 2, further comprising writing to a third recording surface multiple interleaved sets of servo sector patterns, wherein the identifying step further comprises identifying a selected one of the multiple interleaved sets of servo sector patterns on the third recording surface that provides a desired angular alignment with the reference servo sector pattern.

5. The method of claim 4 wherein the overwriting step further comprises overwriting the remaining ones of the multiple interleaved sets of servo sector patterns on the third recording surface.

6. The method of claim 1, further comprising axially aligning the first and second recording surfaces onto a motor in a data storage device prior to the respective writing steps.

7. The method of claim 1, wherein at least one additional servo sector pattern is written to the first recording surface during the writing to a first recording surface step so that the first recording surface is nominally identical to the second recording surface at the conclusion of the respective writing steps.

8. The method of claim 1, wherein servo sectors of the multiple interleaved sets of servo sector patterns written to the second recording surface are each provided with a marker field to which an identifying pattern is written to denote to which of the sets of servo sector patterns each servo sector belongs.

9. The method of claim 1, wherein the desired angular alignment results in the selected serve sector pattern falling within a specified timing window with respect to the reference servo sector pattern.

10. A servo control circuit with programming that compares an angular alignment of a reference set of servo sectors on a reference recording surface with each of a plurality of interleaved sets of servo sectors on a second recording surface for selecting a set of the plurality of sets that is utilized in servo-positioning with respect to the second recording surface.

11. The circuit of claim 10 that further overwrites the non-selected sets of servo sectors on the recording surfaces.

12. The circuit of claim 10, wherein the respective servo sectors are prerecorded onto the respective recording surfaces in a multiple disc writing (MDW) station prior to installation of the first and second recording surfaces into a disc stack.

13. The circuit of claim 10, wherein the respective servo sectors are recorded onto the respective recording surfaces by data transducing heads of a data storage device using a servo track writing (STW) station.

14. The circuit of claim 10, wherein the number of the plurality of interleaved sets of servo sectors equals two.

15. The circuit of claim 10, wherein the plurality of interleaved sets of servo sectors are equally spaced about a plurality of the data recording surfaces.

16. The circuit of claim 10, wherein at least one additional set of servo sectors is written to the reference recording surface so that the reference recording surface is nominally identical to one of a plurality of the data recording surfaces prior to selecting the set of servo sectors for the data recording surface.

17. The circuit of claim 10, wherein the servo sectors of the plurality of interleaved sets of servo sectors are each provided with a marker field to which an identifying pattern is written to denote to which of the sets each servo sector belongs.

18. The circuit of claim 10, wherein a desired angular alignment results in the selected set of servo sectors falling within a specified timing window with respect to the reference set of servo sectors.

19. A data storage device comprising:
   a read/write head in a data transfer relationship with a data storage medium; and
   means for writing servo information to the medium for servo-positioning control of the head.

20. The device of claim 19 wherein the means for writing is characterized by aligning the servo information between two different medium surfaces by selecting an aligned servo sector pattern from a plurality of interleaved sets of servo sector patterns.

\* \* \* \* \*